US010216800B2

(12) United States Patent
Grainger (10) Patent No.: US 10,216,800 B2
(45) Date of Patent: Feb. 26, 2019

(54) SELF EXPIRING SOCIAL MEDIA (71) Applicant: Rocket Apps, Inc., Irvine, CA (US)

(72) Inventor: Ryan Joseph Grainger, Irvine, CA (US)

(73) Assignee: ROCKET APPS, INC., Irvine, CA (US)

(*) Notice: Subject to any disclaimer, the term of this patent is extended or adjusted under 35 U.S.C. 154(b) by 516 days.

(21) Appl. No.: 14/743,005

(22) Filed: Jun. 18, 2015

(65) Prior Publication Data
US 2016/0371272 A1 Dec. 22, 2016

(51) Int. Cl.
G06F 17/30 (2006.01)
H04L 12/58 (2006.01)
G06Q 30/02 (2012.01)

(52) U.S. Cl.
CPC ...... G06F 17/3053 (2013.01); G06F 17/3087 (2013.01); G06Q 30/0269 (2013.01); H04L 51/18 (2013.01); H04L 51/32 (2013.01)

(58) Field of Classification Search
CPC .................................................. G06F 17/3053
USPC ......................................................... 709/206
See application file for complete search history.

(56) References Cited

U.S. PATENT DOCUMENTS

| | | | | |
|---|---|---|---|---|
| 6,202,058 B1 * | 3/2001 | Rose | ................. | G06F 17/30699 706/45 |
| 6,807,566 B1 * | 10/2004 | Bates | ..................... | H04L 51/12 709/206 |
| 7,904,510 B2 * | 3/2011 | Anderson | ............... | G06F 17/24 707/662 |
| 8,280,014 B1 * | 10/2012 | Bowerman | ....... | H04M 3/53383 370/352 |
| 8,516,052 B2 * | 8/2013 | Fu | ....................... | H04L 12/1818 709/205 |
| 8,666,979 B2 * | 3/2014 | Chen | .................. | G06F 17/30525 705/319 |
| 8,983,974 B1 * | 3/2015 | Jackson | ............ | G06F 17/30699 707/748 |
| 9,002,956 B1 * | 4/2015 | Karam | .................... | H04L 51/32 709/205 |
| 9,081,533 B1 * | 7/2015 | West | ...................... | G06F 3/1272 |
| 9,100,629 B1 * | 8/2015 | Brenden | ................. | A63F 13/86 |
| 9,483,529 B1 * | 11/2016 | Pasoi | .................. | G06F 17/3053 |
| 9,824,145 B1 * | 11/2017 | Rohrweck | ............. | G06Q 50/01 |
| 9,875,286 B1 * | 1/2018 | Lewis | ................. | G06F 17/3053 |
| 2001/0038713 A1 * | 11/2001 | Kitagawa | ................. | G06T 7/20 382/209 |

(Continued)

Primary Examiner — Ondrej C Vostal
(74) Attorney, Agent, or Firm — Schwabe Williamson & Wyatt, PC (57) ABSTRACT A social media management system receives messages posted by users. The management system assigns an initial number of units to the messages and receives inputs from the users assigning additional units to the messages. The management system periodically reduces the number of units assigned to the messages eventually causing the messages to self-expire. The management system ranks the messages in an order based on the number of units currently assigned to the messages. The social media management system also may identify a location for a user and identify a ranked subset of the messages within a particular region of the identified location. The management system also may rank users based on the rankings of their posted messages and the ratings the users assign to other messages.

14 Claims, 9 Drawing Sheets

(56) References Cited

U.S. PATENT DOCUMENTS

| | | | |
|---|---|---|---|
| 2006/0004914 A1* | 1/2006 | Kelly | G06Q 30/00 709/219 |
| 2008/0030496 A1* | 2/2008 | Lee | G06Q 10/10 345/418 |
| 2008/0046511 A1* | 2/2008 | Skrenta | G06Q 10/107 709/204 |
| 2008/0127320 A1* | 5/2008 | De Lutiis | H04L 29/12216 726/9 |
| 2008/0172469 A1* | 7/2008 | Verona | H04L 51/34 709/206 |
| 2010/0088246 A1* | 4/2010 | Lim | G06Q 10/10 705/319 |
| 2010/0228631 A1* | 9/2010 | Zhang | G06Q 30/02 705/14.66 |
| 2010/0257117 A1* | 10/2010 | Shvadron | G06F 17/30616 705/36 R |
| 2011/0022602 A1* | 1/2011 | Luo | G06Q 10/10 707/748 |
| 2012/0079023 A1* | 3/2012 | Tejada-Gamero | G06Q 10/06 709/204 |
| 2012/0089681 A1* | 4/2012 | Chowdhury | H04L 12/6418 709/206 |
| 2012/0143666 A1* | 6/2012 | Carrion | G06Q 30/02 705/14.22 |
| 2012/0143963 A1* | 6/2012 | Kennberg | G06Q 10/107 709/206 |
| 2012/0150972 A1* | 6/2012 | Morris | G06Q 50/00 709/206 |
| 2012/0266081 A1* | 10/2012 | Kao | G06Q 50/01 715/751 |
| 2012/0278411 A1* | 11/2012 | Lavine | G06F 17/30477 709/206 |
| 2012/0284336 A1* | 11/2012 | Schmidt | H04W 4/21 709/204 |
| 2012/0290977 A1* | 11/2012 | Devecka | H04W 4/206 715/810 |
| 2013/0124499 A1* | 5/2013 | Liau | G06F 15/16 707/709 |
| 2013/0138741 A1* | 5/2013 | Redstone | G06F 17/3087 709/204 |
| 2013/0152047 A1* | 6/2013 | Moorthi | G06F 11/368 717/124 |
| 2013/0226912 A1* | 8/2013 | Agapiev | G06F 17/30867 707/723 |
| 2013/0262584 A1* | 10/2013 | Zadeh | G06F 17/2247 709/204 |
| 2013/0275894 A1* | 10/2013 | Bell | G06F 3/0481 715/764 |
| 2013/0282841 A1* | 10/2013 | Bates | H04L 51/32 709/206 |
| 2014/0006395 A1* | 1/2014 | Wolfe | G06F 17/30268 707/732 |
| 2014/0068515 A1* | 3/2014 | Atacik | G06F 17/30746 715/810 |
| 2014/0089423 A1* | 3/2014 | Jackels | H04N 21/4788 709/206 |
| 2014/0188681 A1* | 7/2014 | Shahghasemi | G06Q 20/22 705/37 |
| 2014/0244744 A1* | 8/2014 | Lyren | G06Q 50/01 709/204 |
| 2014/0244765 A1* | 8/2014 | Smith | H04L 51/24 709/206 |
| 2014/0379798 A1* | 12/2014 | Bunner | G06Q 50/01 709/204 |
| 2015/0100396 A1* | 4/2015 | Boury | G06Q 30/0229 705/14.3 |
| 2015/0256499 A1* | 9/2015 | Kumar | H04L 51/28 709/206 |
| 2015/0256679 A1* | 9/2015 | Burnett | H04M 3/533 379/88.12 |
| 2015/0287119 A1* | 10/2015 | Bhan | G06Q 30/0629 705/5 |
| 2015/0304437 A1* | 10/2015 | Vaccari | G06F 1/3215 709/204 |
| 2016/0026687 A1* | 1/2016 | Aitchison | G06F 17/30654 707/694 |
| 2016/0034463 A1* | 2/2016 | Brewer | H04L 43/12 707/734 |
| 2016/0041982 A1* | 2/2016 | He | G06F 17/3053 707/728 |
| 2016/0162482 A1* | 6/2016 | Pesavento | G06K 9/46 707/728 |
| 2016/0173537 A1* | 6/2016 | Kumar | H04L 61/10 709/228 |
| 2016/0196354 A1* | 7/2016 | Srinivasan | G06F 17/30867 707/733 |
| 2016/0299891 A1* | 10/2016 | Koutrika | G06F 17/27 |

\* cited by examiner

SELF EXPIRING SOCIAL MEDIA

BACKGROUND

Social networks allow users to post messages that may include pictures, videos, or any other type of social media. Users can rate the messages either by liking the message (thumbs up), disliking the message (thumbs down), or following the users posting the messages. Social networks also may identify popular trending topics with the most user views, likes, etc.

User accounts may include hundreds of messages with hundreds of pictures or videos. Popular pictures may reside on user accounts indefinitely. Therefore, simply searching for popular pictures may not necessarily reveal the most current popular pictures. Popular pictures also may be located directly next to unpopular pictures. Therefore, a user may need to perform multiple searches to locate the most current popular pictures or videos.

DETAILED DESCRIPTION

Figure 1:
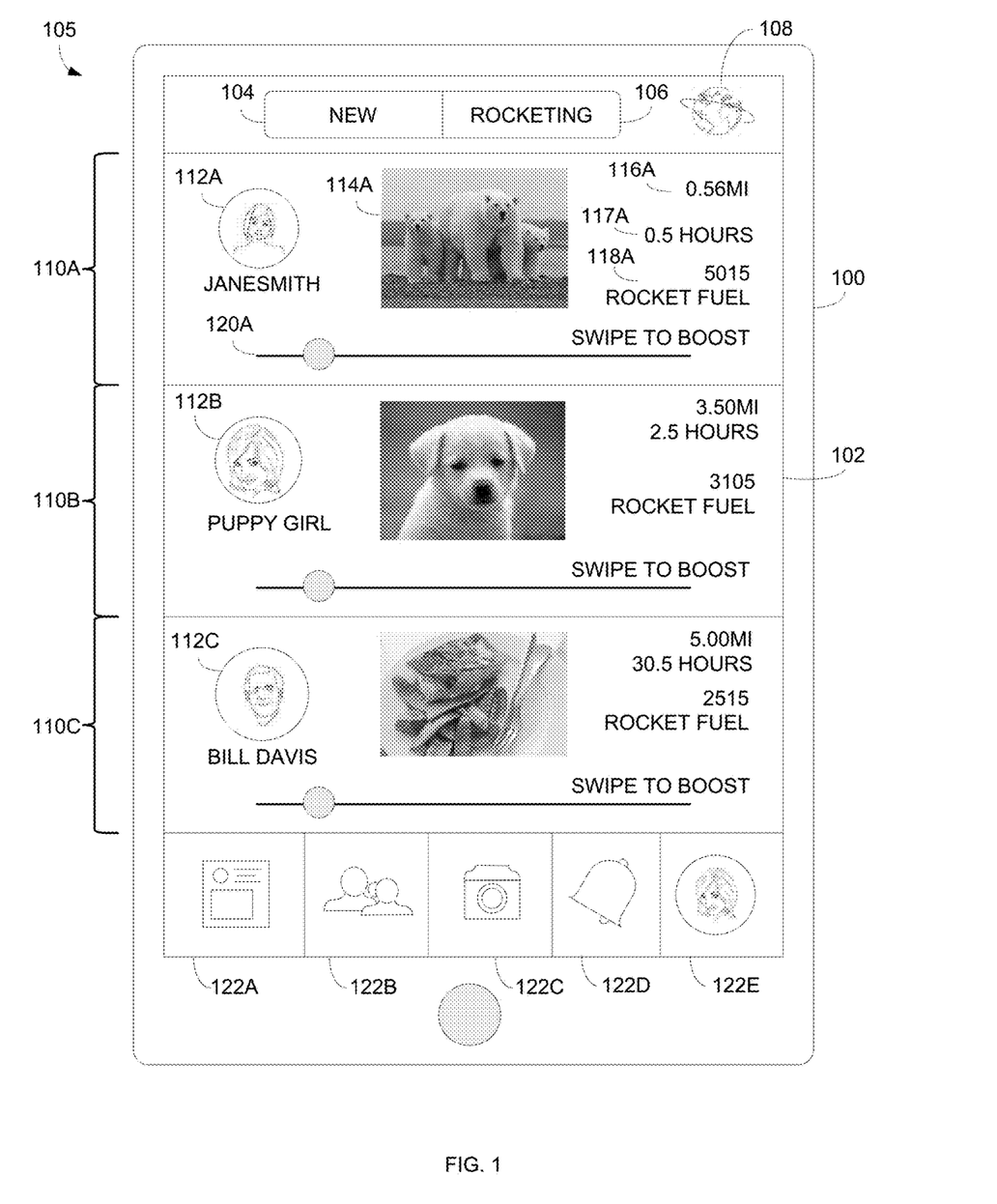
FIG. 1 depicts an example user device displaying a list of self-expiring ranked pictures.

FIG. 1 shows a user device 100 including a screen 102 for displaying different messages 110 in a ranked message list 105. Messages 100 may include any combination of text, pictures, audio, video, or any other data generally referred to as social media. The examples below refer to different pictures 114 contained in messages 110. However, messages 110 may contain any of the other types of social media mentioned above.

Users post pictures 114 to a social media management system described below in FIG. 5. The social media management system assigns an initial number of points 118 to pictures 114. For example, the management system may assign 1000 initial points to each posted picture 114. Points 118 are alternatively referred to as units or rocket fuel.

Users may assign additional points 118 to picture 114. For example, the management system may display a selector next to each picture 114, such as an electronic slider 120. A user may move electronic sliders 120 to the right to increase the number of points for assigning to pictures 114. The management system detects the location of slider 120 and adds the associated number of points to picture 114. In one example, the management system may assign the same number of points indicated by electronic slider 120 to the associated picture 114 and to the user assigning the points. The management system may limit users to assigning points 118 to a particular message 110 once. This may prevent any one user from keeping a particular message 110 from expiring as described below.

The management system ranks messages 110 based on the number of associated points 118 and displays the messages based on the message rankings. For example, the management system may display message 110A with a highest number of 5015 points first, display message 110B with a second highest number of 3105 points second, display message 110C with 2515 points third, etc.

The management system may display images and user names for users 112 that post messages 110. For example, message 110A was posted by a user 112A. The management system may display a distance 116 between the user device displaying messages 110 and the user devices that posted messages 110. For example, user 112B may operate user device 100. The management system may display a distance 116A between user device 100 and the user device operated by user 112A. The management system also may display an amount of time 117 messages 110 have been posted. For example, time 117A indicates message 110A has been posted for 0.5 hours.

The management system may automatically reduce the number of points assigned to messages 110 based on the amount of time the messages have been posted. For example, the management system may automatically subtract 25 points each hour the message is posted. In one example, the management system may reduce the number of points proportionally to the number of posted messages 110. For example, the management system may subtract 50 points per hour from each message 110 when the total number of posted messages 110 is greater than 250. This sliding scale gleans older messages faster when there are more posted messages. Of course any configurable number of points may be subtracted for any configurable time period for any configurable number of posted messages.

The management system may automatically remove messages 110 when the associated number of points drops to zero. This self-expiring feature removes messages 110 that may no longer be of interest to users. For example, the management system may continue to post message 110A as long new users continue to assign additional points 118A. However, as time passes fewer new users may view and assign additional points 118A eventually causing the management system to remove message 110A.

Automatic message expiration prevents users from having to view the same messages 110 every time they view a message list 105 making it easier to locate the latest and most popular messages 110. The constant point boost provided by users also maintains high rankings for the most popular messages 110 while quickly removing or downgrading rankings for unpopular content with no additional point boosts.

The management system may display different icons 122 on screen 102 for navigating to different electronic pages or functions. For example, selection of a newsfeed icon 122A may navigate to an electronic page displaying the ranked list of messages 110 in FIG. 1. Selection of an icon 122B may navigate to an electronic page displaying a ranked list of users as discussed below in FIG. 3.

Selection of an icon 122C may direct the management system to post pictures, access a camera on user device 100 for taking pictures, access pictures stored on user device 100, tag pictures, send pictures, or otherwise manage pictures or other social media. Selection of icon 122D may display alerts generated by the management system. Selection of icon 122E may access and edit a profile associated with user 112B.

A user may select icon 104 to display an electronic page showing the most recently posted messages 110. For example, the management system may display messages 110 in an ordered list with the most recently posted messages at the top of the list and the least recently posted messages at the bottom of the list. Selecting icon 106 may display messages 110 in an order list based on number of associated points 118 as shown in FIG. 1.

In one example, the management system may display messages 110 posted by users within a same region. For example, the management system may identify the location of user device 100 and identify a geographical region around that location. The management system then may identify and rank other messages 110 associated with the same region or associated with devices that are currently in the same region. Selecting an icon 108 may display an electronic map and the region associated with user device 100. The electronic map is discussed in more detail below in FIG. 2.

Figure 2:
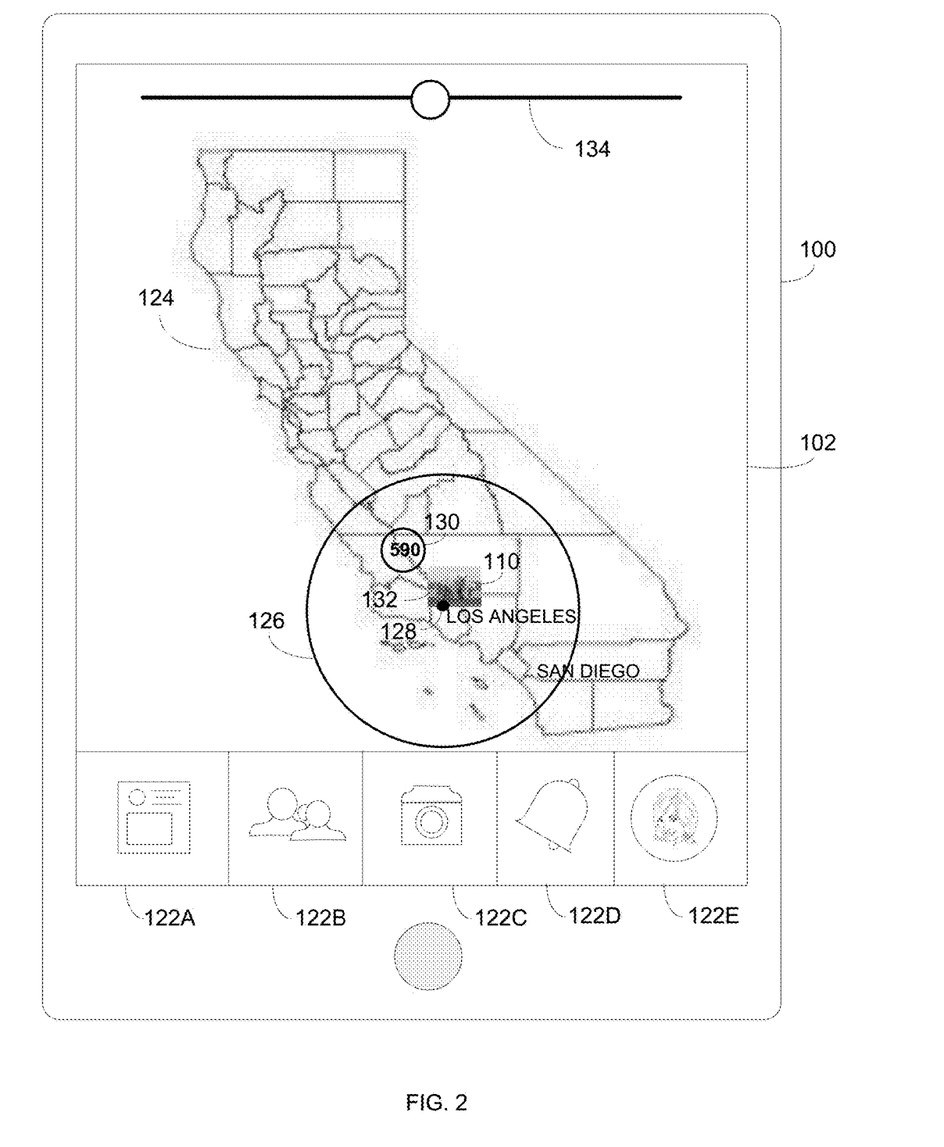
FIG. 2 depicts an example user device displaying a region of ranked pictures.

FIG. 2 shows an electronic map 124 displayed by the social media management system. User device 100 may include a global positioning system (GPS) that identifies a current location 128 on map 124. The management system may identify a region 126 around location 128. For example, the management system may identify a 100 miles radius around location 128 as region 126.

The social media management system may identify other user devices and/or messages 110 within region 126. For example, users either may tag messages with a location or user devices may transmit locations to the management system. The management system may identify a subset of users and/or messages 110 within region 126 and also may identify a number 130 of the users and/or messages.

In another example, the management system also may display thumbnail images 132 for some of the most popular messages within region 126. Selecting icon 122A then causes the management system to display the ranked list of messages 110 within region 126.

A user may use an electronic selector to vary the radius of region 126. For example, the user may drag an electronic slider 134 to the left to reduce the radius of region 126 and drag electronic slider 134 to the right to increase the radius of region 126. The management system then may create a new ranked list of pictures 110 for the new region 126.

The management system may limit the radius of region 126 to incentivize users to post messages and rate other posted messages. For example, the management system may allow a user to drag electronic slider 134 further to the right and increase the radius of region 126 based on a total number of points assigned to the user as described below in FIG. 3.

Figure 3:
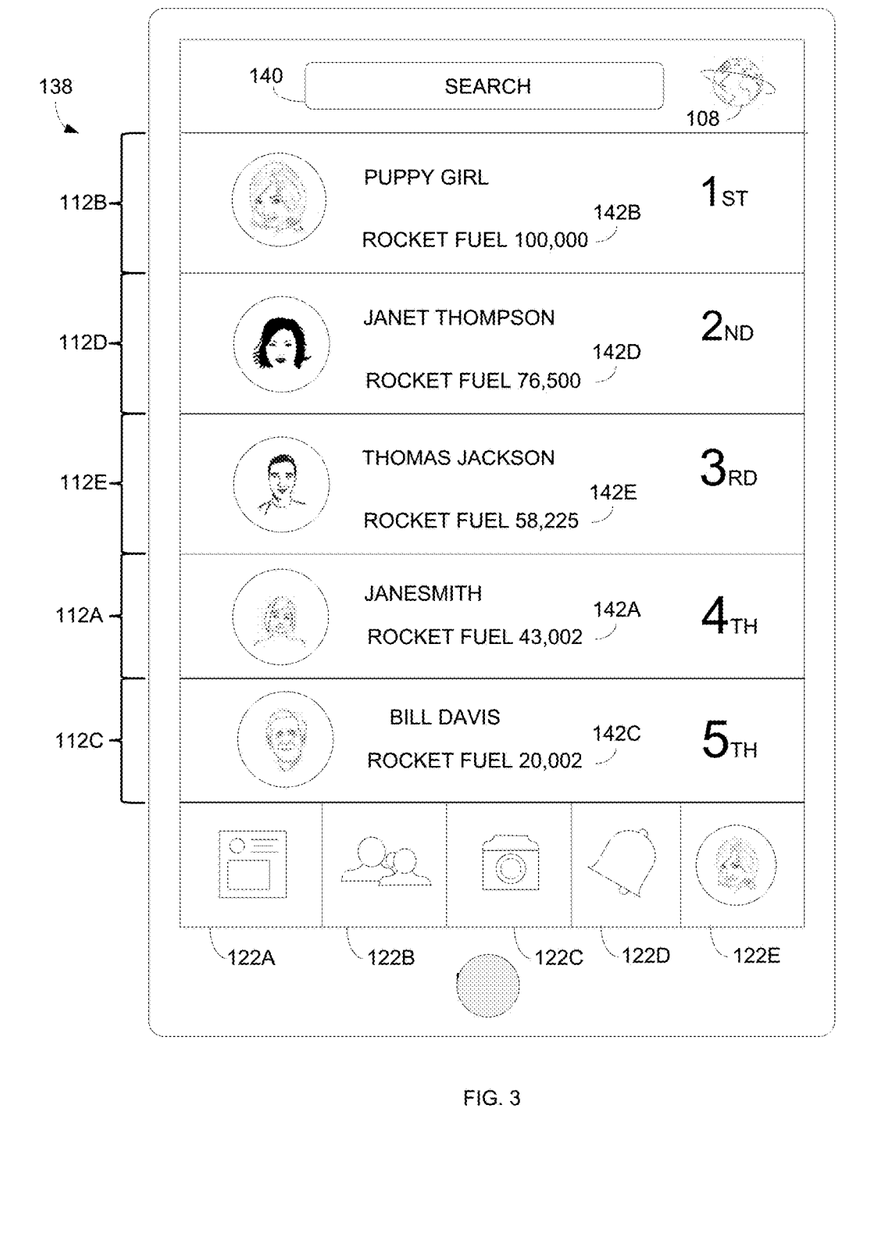
FIG. 3 depicts an example user device displaying a list of ranked users.

FIG. 3 shows a ranked user list 138. The management system may assign users 112 points 142 based on different activities and the popularity of associated messages. For example, the management system may assign users 112 all of the points 118 currently assigned to their associated posted messages 110 in FIG. 1. User 112B may have posted multiple messages with a combined point total of 70,000. The management system may assign all 70,000 points to user 112B as user points 142B.

User 112B also may have assigned points (e.g., rated) to messages posted by other users. To award the social feedback, the management system also may assign user 112B the same or some portion of the number of the point's user 112B assigned to other posted messages. The management system may assign an additional 30,000 points to user 112B for rating other messages for a total of 100,000 user points 142B. The management system also may award points to users 112 that recruit other users to join the social network. For example, the management system may assign a predetermined number of points to users that send email or text message invitation to contacts.

The management system accumulates and assigns points to users 112A-112E based on the points assigned their associated messages, the number and/or amount of ratings given to other messages, and the number of invitations. The management system then ranks users 112 based on the number of associated user points 142. For example, user 112B has the largest total number of user points 142B and is displayed at the top of user list 138. User 112D has a second highest total number of user points 142D and is displayed second in user list 138.

The management system also may automatically reduce the number of user points 142. For example, the management system may reduce user points 142 by the same amount message points 118 are reduced in FIG. 1. For example, if the messages posted by user 112B are reduced by 15,000 points, user points 142B are also reduced by 15,000 points. The management system also may reduce points previously assigned to user 112B for rating other posted messages or sending invitations to contacts.

Ranking users 112 and automatically reducing user points 142 promote social interaction. For example, users 112 may need to continue to post new messages and rank other posted messages to maintain a high ranking in user list 138. Users 112 are also highly rewarded for posting popular messages, since large numbers of other users may contribute to the user points 142 for that particular user.

The management system may display a search field 140 to search for particular users or comments. For example, the management system may search and display one of users 112 with a user name matching an entry entered into search field 140.

Figure 4:
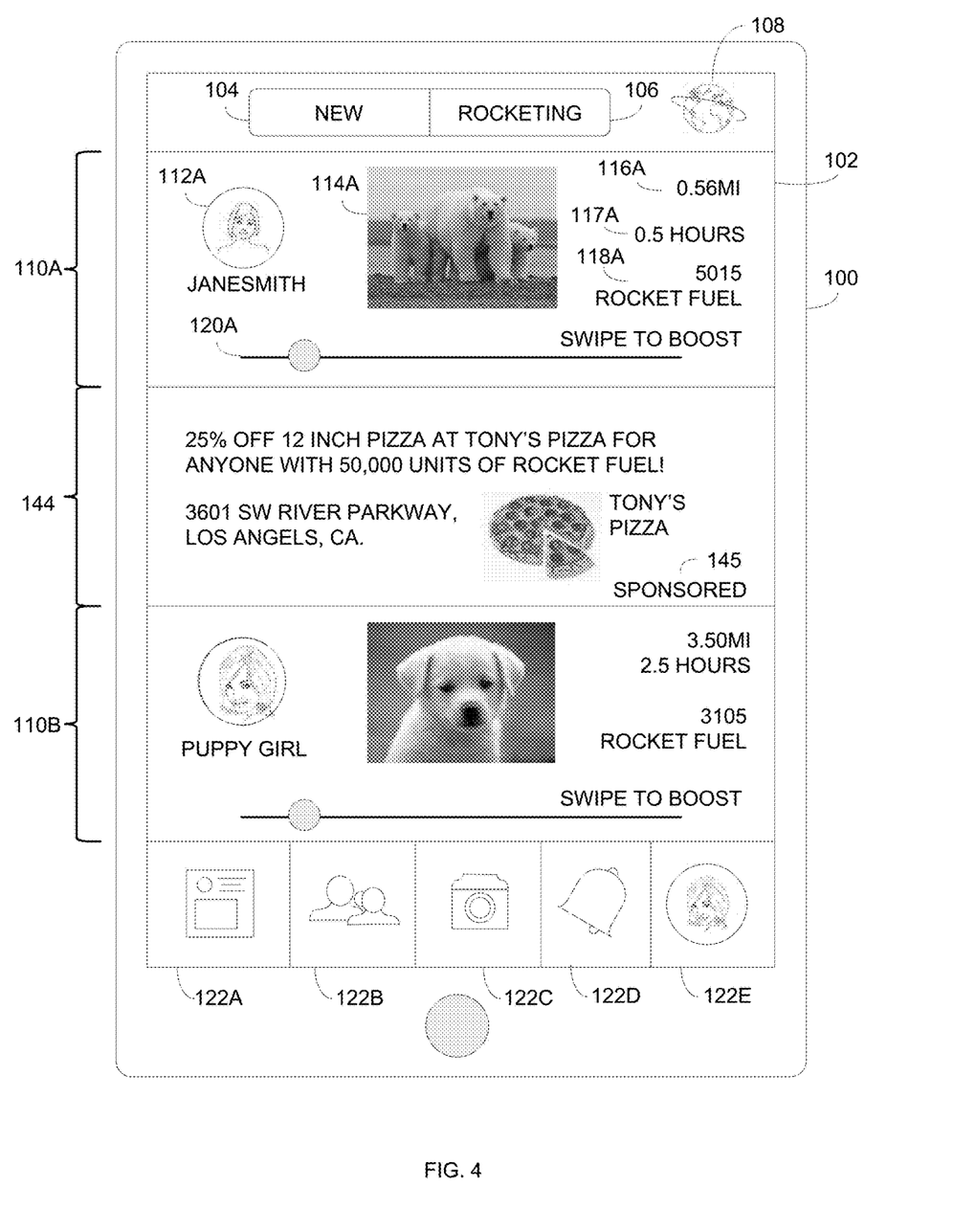
FIG. 4 depicts an example user device displaying advertisements in conjunction with a list of ranked pictures.

FIG. 4 shows an example advertisement 144 inserted next to the highest ranked messages 110A and 110B. In another example, the management system may display popup windows that display advertisements 144. In one example, advertisement 144 has no associated points 118 and the management system automatically inserts advertisement 144 next to one of the highest ranked messages 110. For example, the management system may locate advertisement 144 between the two highest ranked messages 110A and 110B. In another example, the management system may locate advertisement 144 above the highest ranked message 110A or in any other location where advertisement 144 is most likely and/or most often to be viewed.

Advertisement 144 may include a sponsored label 145 to distinguish itself from ranked messages 110. Advertisement 144 may include incentives for engaging in more social interaction. For example, advertisement 144 may include a coupon for reduced goods or services for any user with more than some threshold number of user points.

In another example, the management system may store advertisements associated with different locations. The management system may identify the location of user device 100 and a range around the identified location. The management system then may push any of the advertisements 144 that have associated locations within the identified range of user device 100. The management system may cycle through different advertisements within the current range of user device 100.

In one example, the management system may generate a notification when user device 100 moves into a region associated with a particular enterprise. The notification may indicate a discount for a product or service associated with the enterprise based on the number of user points. The notification provides an incentive for the user to immediately purchase the discounted product or service since as time passes the user may not retain the current level of user points.

Figure 5:
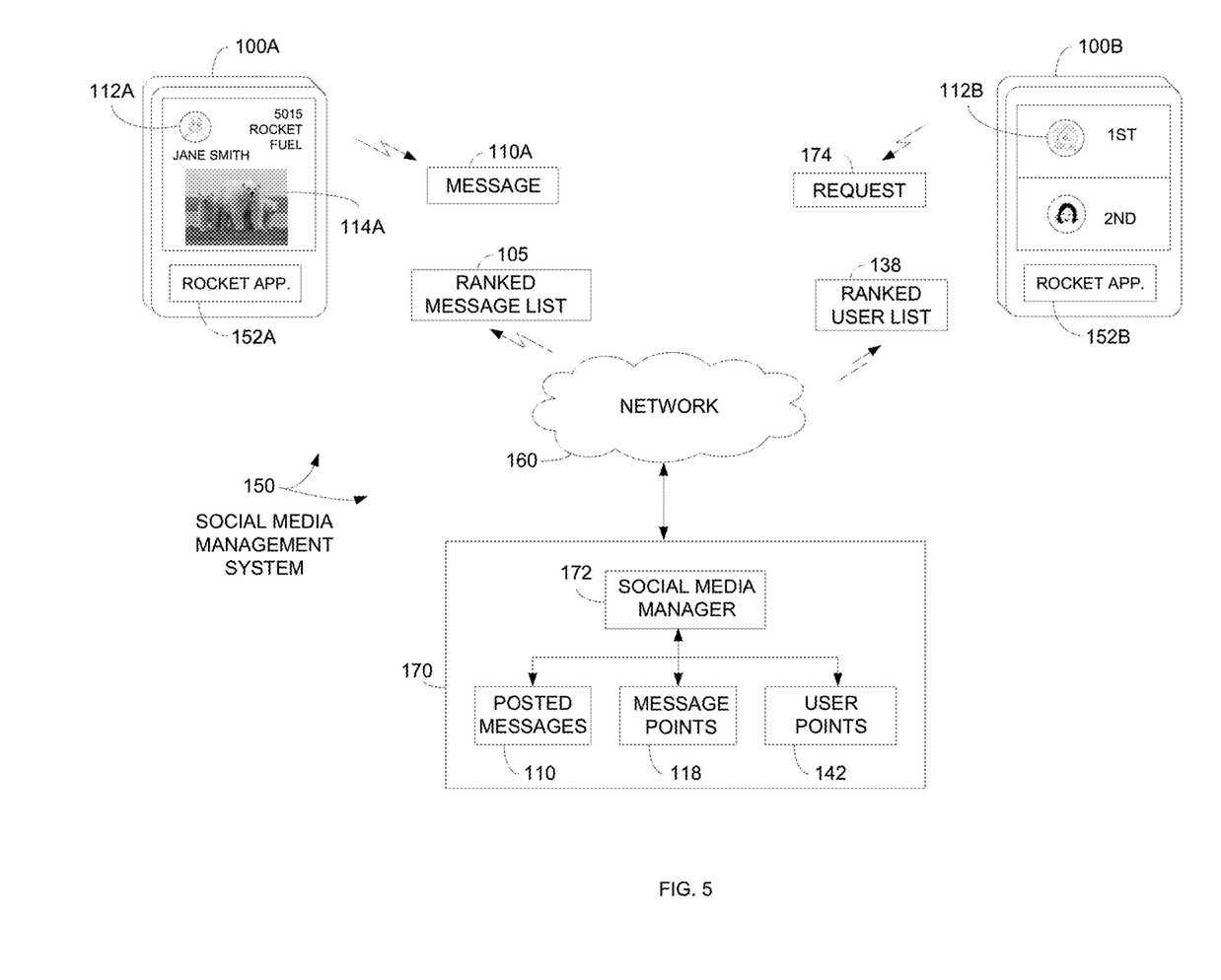
FIG. 5 depicts an example social media management system.

FIG. 5 shows an example social media management system 150 that manages self-expiring social media. Different user devices 110 communicate over a network 160 with a network server 170. Network server 170 may operate a social media manager 172 that stores messages 110 received from user devices 100, tracks message points 118, tracks user points 142, and generates ranked message lists 105 and ranked user lists 138 as described above.

Network 160 may include any combination of local area networks (LANs), wide area networks (WANs), Internet Protocol (IP) networks, phone networks, Public Services Telephone Networks (PSTN), wireless networks, cellular networks, Wi-Fi networks, Bluetooth networks, cable networks, data buses, or the like, or any combination thereof used for transferring information between user devices 100 and network server 170.

User devices 100 may comprise any computing device operated by a user for communicating with network server 170. For example, user devices 100 may include tablet computers, hand-held devices, smart telephones, mobile telephones, personal digital assistants (PDAs), laptop computers, personal computers, computer terminals, PSTN telephones, voice over internet protocol (VoIP) phones, or the like, or any combination thereof. In another example, user devices 100 may include computers, such as servers, that communicate with social media manager 172 through application programming interfaces (APIs).

Applications 152 operating on user devices 100 are alternatively referred to as rocket applications and may perform some of the functions described above. For example, a user on device 100A may use application 152A to post picture 114A to social media manager 172. Application 152A may send message 110A to social media manager 172 that contains picture 114A. Message 110A also may include other associated metadata, such as an identifier for user 112A and a current GPS position of user device 100A.

Social media manager 172 assigns message points 118 to picture 114A and assigns equivalent user points 142 to user 112A. Another user 112B may use application 152B to assign points (rate) to posted picture 114A. Application 152B may send a request 174 to social media manager 172 identifying the number of points for adding to picture 114A. Social media manager 172 assigns the additional message points 118 to picture 114A and assigns additional user points 142 to user 112A and user 112B.

Social media manager 172 may periodically reduce message points 118 for posted messages 110 and equivalently reduce user points 142 for the associated users 112. Social media manager 172 also may periodically reduce other user points 142 not associated with posted messages 110. For example, the social media manager 172 may reduce user points 142 received by ranking messages posted by other users or by recruiting other members.

User 112A may use application 152A to send a request to social media manager 172 for ranked message list 105. The request may include a GPS location. Social media manager 172 may identify a range around the GPS location, identify any posted messages 110 within the identified range, rank the pictures based on the number of assigned message points 118, and send ranked message list 105 back to application 152A. Application 152A then may display ranked message list 105 on user device 100A.

In another example, user 112B may use application 152 to send another request 174 to social media manager 172 for ranked user list 138. Request 174 may include a GPS location. Social media manager 172 may identify a range around the GPS location and identify users within the range. Social media manager 172 then ranks the identified users 112 based on their accumulate user points 142 and sends ranked user list 138 back to user device 112B. In another example, application 152B may request social media manager 172 to determine an overall ranked user list 138 for all users 112 regardless of their location relative to user 112B.

Any of the operations described above could alternatively be performed locally by applications 152. For example, applications 152 may display the different icons described above, request the different lists and other data described above based on the selected icons, identify locations and ranges associated with user device 100, receive and store pictures 114 from other users 112, track points for pictures and associated users, rank the pictures and associated users, and/or generate ranked message lists 105 and ranked user lists 138.

Figure 6:
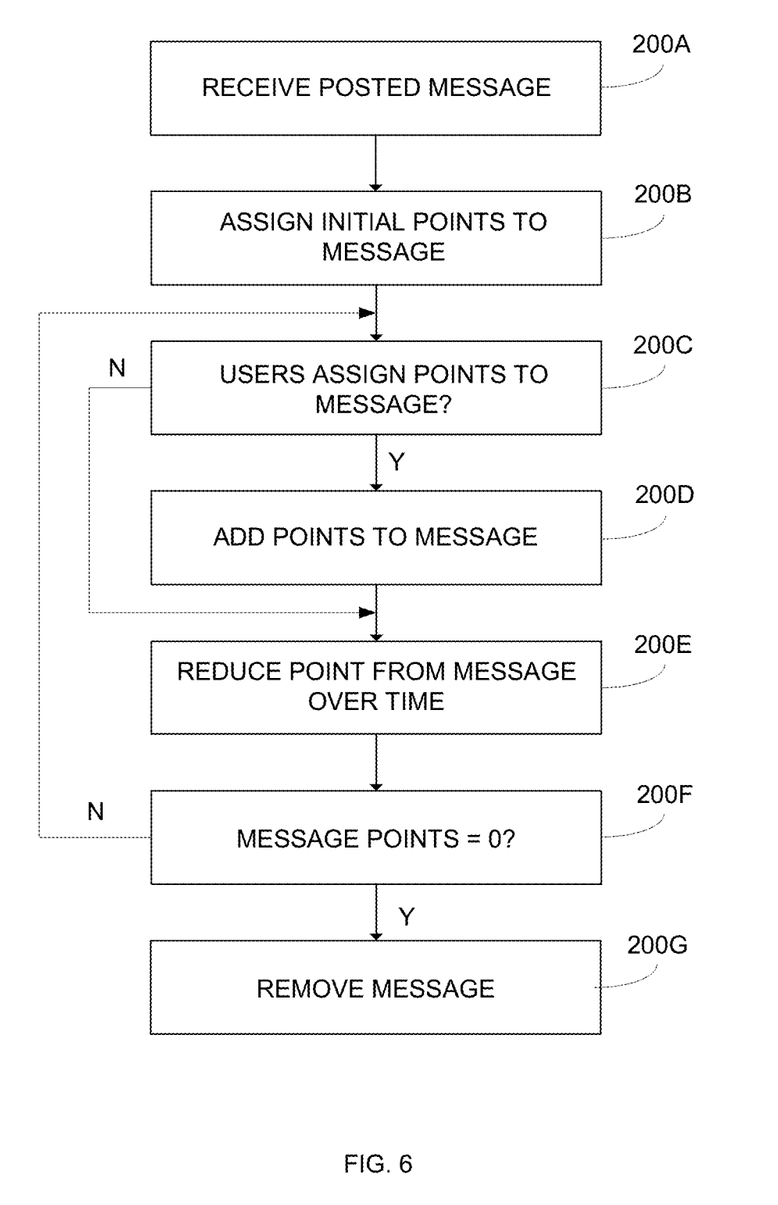
FIG. 6 depicts an example process for ranking messages.

FIG. 6 shows an example process for assigning points to messages. In operation 200A, the social media manager may receive a posted message, such as a picture, video, and/or text. In operation 200B, the manager assigns the message an initial number of points.

In operation 200C, other users may assign additional points to the message. For example, a user may assign a high ranking to the message by assigning the message a higher number of points. In operation 200D, the social media manager adds the additional points to the message.

In operation 200E, the social media manager reduces the points previously assigned to messages based on the amount of time the messages have been posted. For example, the social media manager may periodically reduce the points for posted messages by some predetermined amount. If the number of points is reduced to zero in operation 200F, the social media manager in operation 200G removes or deletes the message. Otherwise, the social media manager jumps back to operation 200C and continues to monitor for other users assigning additional points to the message. Thus, unless new users continuously assign additional points, the points will eventually expire and the media manager will remove the message.

Figure 7:
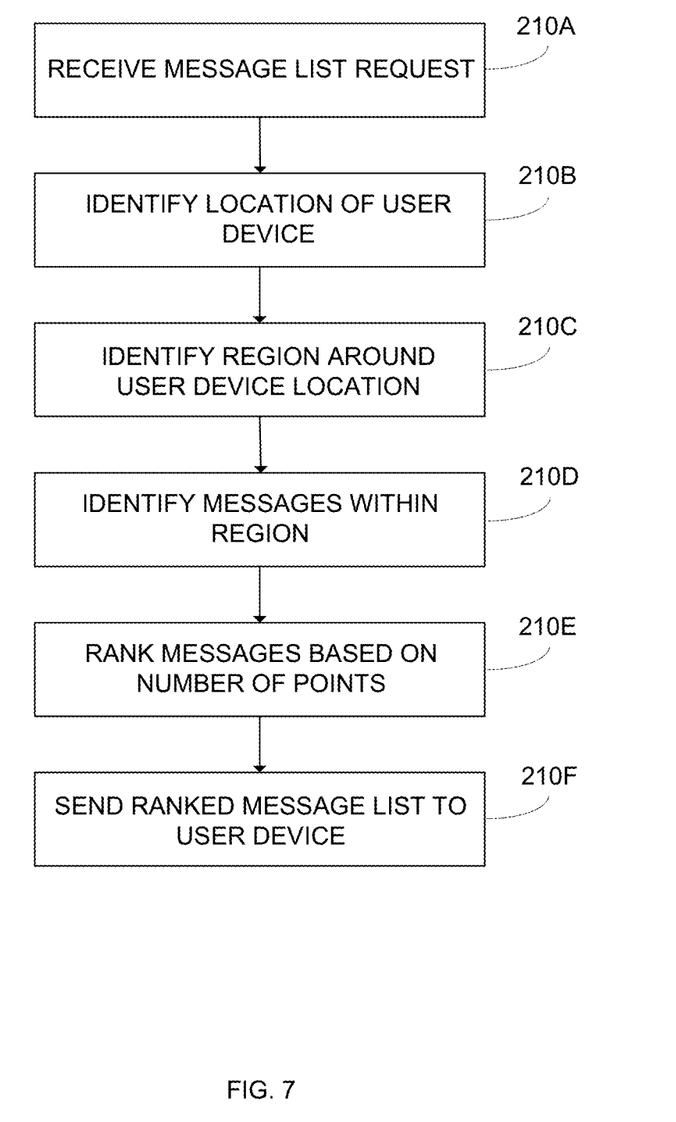
FIG. 7 depicts an example process for ranking messages within a region.

FIG. 7 shows an example process for generating a ranked message list. In operation 210A, the social media manager may receive a request for a ranked message list. For example, a user may select an icon for displaying a list of posted pictures and the application on the user device may send an associated request to the social media manager. In operation 210B, the social media manager identifies a location of the user. As described above, the request may include a GPS location. In operation 210C, the social media manager then may identify a region around the location. For example, the social media manager may identify a distance around the location or identify a city or zip code boundary containing the location.

In operation 210D, the social media manager identifies other messages within the identified region. For example, the applications on the user devices may assign a current location to any posted messages. In other example, the applications operating on the user devices may periodically send current GPS locations to the social media manager. The social media manager then may identify messages posted by any users that are currently within the identified region.

In operation 210E, the social media manager ranks the messages associated with the region based on their assigned points. For example, the message with the largest number of points may be placed on the top of the message list and the message with the fewest number of points may be placed at the bottom of the message list. In operation 210F, the social media manager sends the ranked message list back to the requesting application for displaying on the user device.

Figure 8:
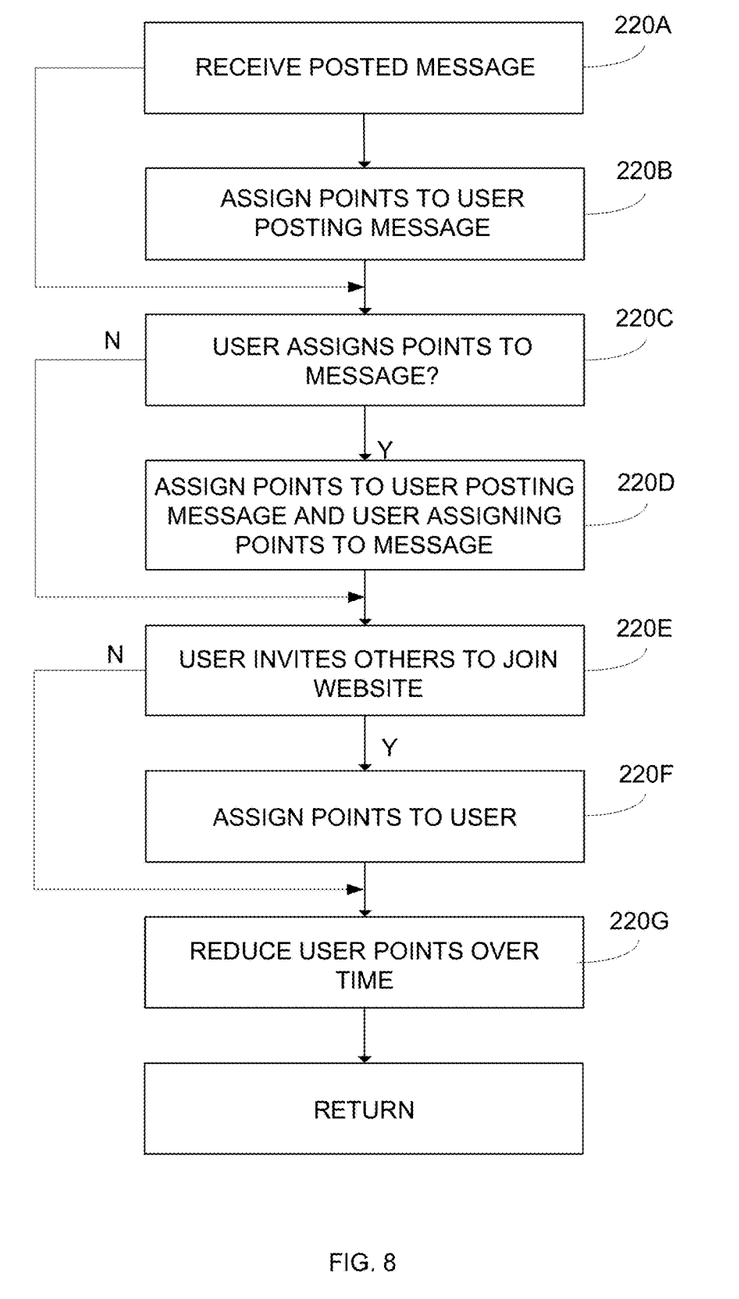
FIG. 8 depicts an example process for ranking users.
Figure 9:
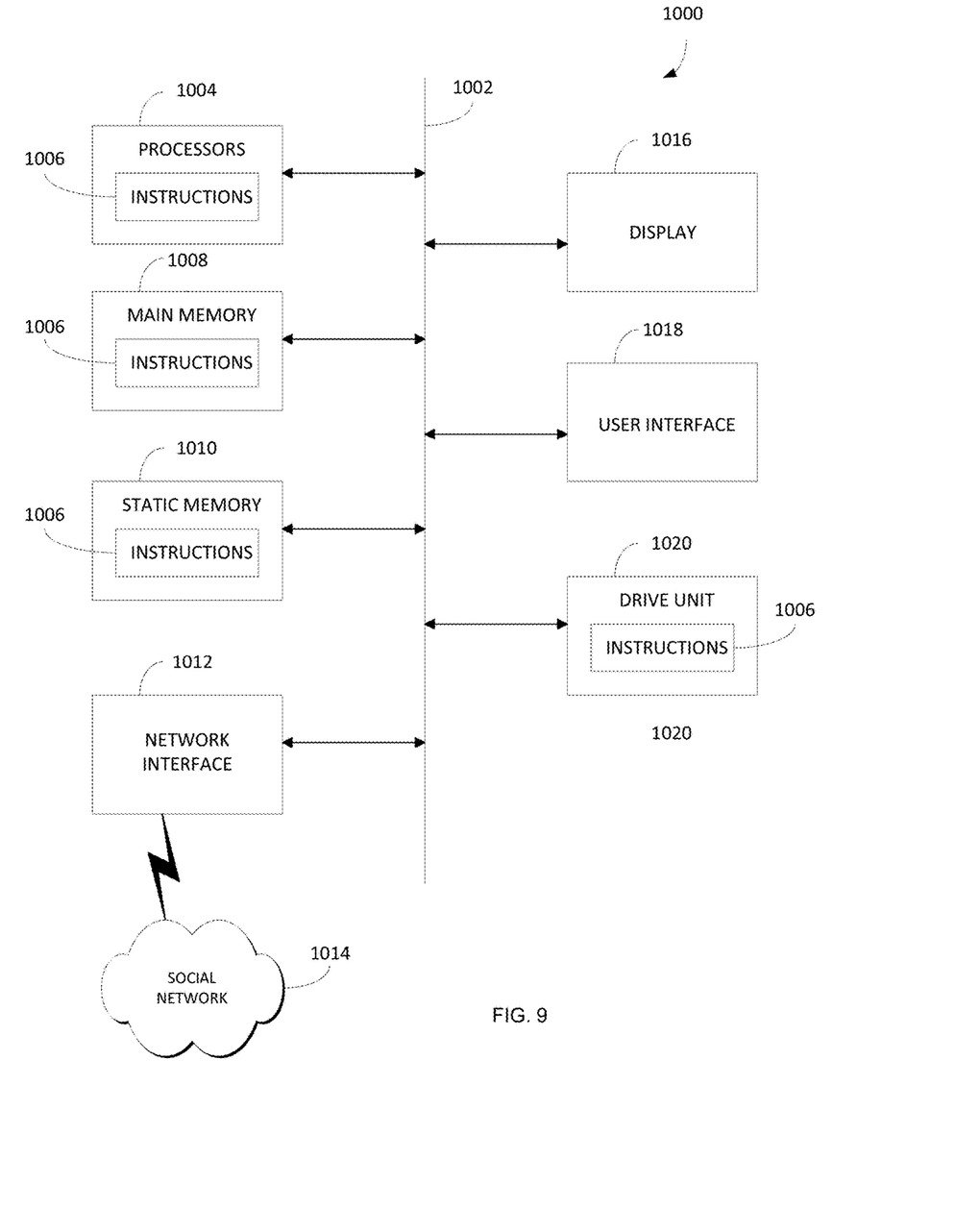
FIG. 9 depicts an example of a device configured to manage self-expiring messages.

FIG. 8 shows an example process for assigning points to users. In operation 220A, the social media manager may receive a posted message. In operation 220B, the social media manager may assign points to the user that posted the message. For example, the social media manager may assign the same number of points to the posted message and to the user that posted the message.

In operation 220C, a user may assign points to a previously posted message. For example, a user may give a picture a high rating by assigning the picture a larger number of points. In operation 220D the social media manager may add the same number of points assigned to the picture to the user that posted the picture. To reward social media participation, the social media manager also may assign some proportional number of points to the user that rated the message.

In operation 220E, a user may send an email to a contact inviting them to join the social media network. For example, the user may identify a contact from a contact list located on the user device. The application operating on the user device may send a message to the contact inviting them to join the social network. The application also may send a message notifying the social media manager of the invitation. In operation 220F, the social media manager assigns the user sending the invitation additional user points to reward the additional social activity. In operation 220G, the social media manager may periodically reduce the number of points currently assigned to the user. This automatic point reduction motivates users to continue to post messages, assign points to other messages, and invite other contacts to join the social media network.

Hardware and Software

FIG. 7 shows a computing device 1000 that may be used in the social media processing system and performing any combination of processes discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A method, comprising:
   receiving, by a computing device, messages posted by a plurality of users;
   assigning, by the computing device, an initial number of units to each of the messages;
   assigning, by the computing device, units to each of the plurality of users that post the messages;
   receiving, by the computing device, inputs from at least one of the plurality of users assigning additional numbers of units to one or more of the messages;
   assigning, by the computing device, units to each of the plurality users assigning additional numbers of units to one or more of the messages;
   reducing, by the computing device, over time the number of units assigned to each of the messages;
   determining whether the number of units assigned to each of the messages has fallen below a predetermined threshold;
   removing each of the messages when each message's number of units falls below the predetermined threshold;
   ranking, by the computing device, the messages in an order based on the number of units assigned to each of the messages;
   causing, by the computing device, each of the messages to be displayed to each of the plurality of users in the order of their rank;
   assigning, by the computing device, units to the users for sending invitations to participate in posting messages;
   generating, by the computing device, a ranked list of the users based on a number of the units assigned to the users; and
   causing, by the computing device, the ranked list of the users to be displayed to each of the plurality of users.

2. The method of claim 1, further comprising:
   identifying, by the computing device, a location for one of the users;
   identifying, by the computing device, a region around the location;
   identifying, by the computing device, a subset of the messages for the users located in the region; and
   ranking, by the computing device, the subset of messages in an order based on the numbers of units assigned to the subset of messages.

3. The method of claim 2, further comprising:
   identifying, by the computing device, an electronic map for the location; and
   causing, by the computing device, display of some highest ranked ones of the subset of the messages to be displayed on the electronic map.

4. The method of claim 1, further comprising:
   receiving, by the computing device, inputs from selectors displayed next to the messages; and
   assigning, by the computing device, the additional numbers of units to the displayed messages based on the inputs received from the selectors.

5. The method of claim 4, further comprising limiting, by the computing device, each of the users to only adding units once to each of the messages.

6. The method of claim 1, further comprising:
   identifying, by the computing device, an amount of time the messages have been posted;
   identifying, by the computing device, the number of units assigned to the messages; and
   causing the amount of time and the number of units to be displayed next to the messages.

7. The method of claim 1, further comprising:
   sending, by the computing device, an advertisement for displaying next to one of the highest ranked messages; and
   identifying, by the computing device, discounts in the advertisements based on the number of units assigned to the users.

8. A computer program stored on a non-transitory tangible medium for displaying pictures, the computer program comprising a set of instructions operable to:
   receive pictures posted by a plurality of users;
   assign an initial number of points to each of the pictures;
   receive an additional number of points from at least one of the plurality of users rating the pictures;
   assign the additional number of points to the pictures;
   reduce the number of points assigned to the pictures based on the amount of time the pictures have been posted;
   determine whether the number of points assigned to each of the pictures has fallen below a predetermined threshold;
   remove each of the pictures when each of the pictures' number of points falls below the predetermined threshold;
   rank the pictures based on the number of points assigned to the pictures;
   cause the pictures to be displayed to each of the plurality of users in the order of their rank;
   assign the points assigned to the pictures to each of the plurality of users posting the pictures;
   assign additional points to each of the plurality of users rating the pictures;
   generate a ranked list of the users based on a number of the points assigned to the users; and
   cause the ranked list of the users to be displayed to each of the plurality of users.

9. The computer program of claim 8, including instructions operable to:
   identify a location for one of the users;
   identify a region around the location;
   identify a subset of the pictures associated with the region;
   rank the subset of pictures based on the number of points assigned to the subset of pictures; and
   list the subset of pictures in an order based on the ranking.

10. The computer program of claim 9, including instructions operable to:
    identify businesses within the region; and
    identify advertisements for the businesses for displaying in combination with some of the subset of pictures with a highest rank.

11. The computer program of claim 9, including instructions operable to:
    identify the region on an electronic map; and
    enable changes to a size of the region on the electronic map based on the number of the points associated with the users.

12. The computer program of claim 9, including instructions operable to:
    identify advertisements for displaying with a highest ranked group of the pictures, wherein the advertisements include discounts based on the number of points associated with the users.

13. The computer program of claim 8, including instructions operable to:
    identify an amount of time the pictures are posted;
    identify the number of points assigned to the pictures;
    identify distances between the user devices posting the pictures and the user devices displaying the pictures; and
    send the amount of time, number of points, and distances to a user device.

14. The computer program of claim 8, including instructions operable to:
    receive inputs from selectors associated with the pictures;
    identify a number of points indicated by the inputs; and
    assign the number of points indicated by the inputs to the associated pictures.

\* \* \* \* \*